Jan. 23, 1962 J. G. INGRES 3,017,962
LIMITING DEVICE FOR AUTOMATIC BRAKE SHOE ADJUSTER
Filed June 23, 1958 2 Sheets-Sheet 1

INVENTOR.
JEANNOT G. INGRES
BY
Whittemore, Hulbert & Belknap
ATTORNEYS

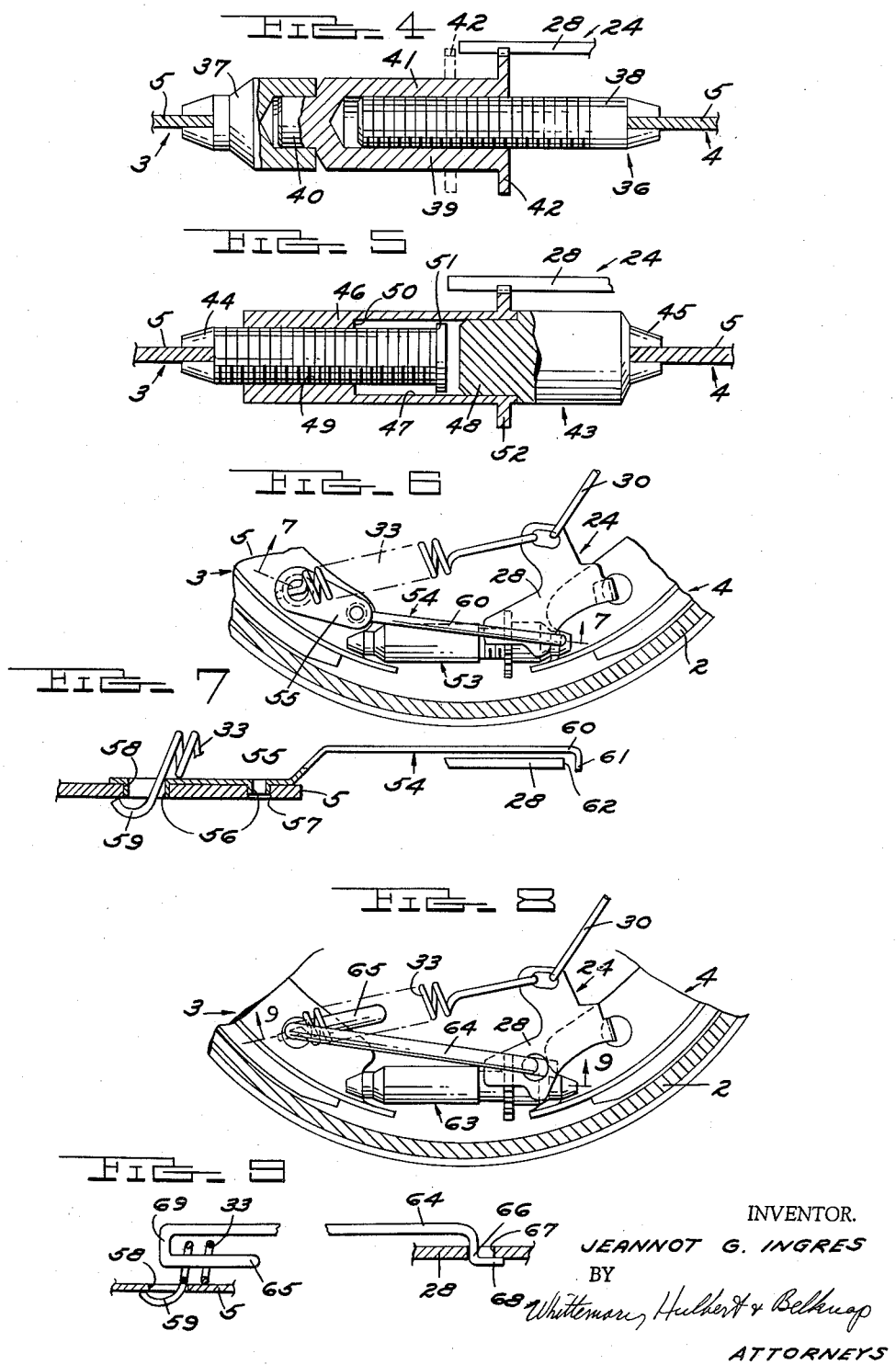

United States Patent Office 3,017,962
Patented Jan. 23, 1962

3,017,962
LIMITING DEVICE FOR AUTOMATIC BRAKE SHOE ADJUSTER
Jeannot G. Ingres, Dearborn, Mich., assignor to Kelsey-Hayes Company, Detroit, Mich., a corporation of Delaware
Filed June 23, 1958, Ser. No. 743,923
2 Claims. (Cl. 188—79.5)

This invention relates to brakes and refers more particularly to vehicle wheel brakes of the type employing an internal friction device and having means for adjusting the friction device to compensate for wear.

The invention has for one of its objects to provide a brake having an internal friction device and means for automatically adjusting the friction device within a predetermined limit of total adjustment to compensate for wear. Beyond this limit the adjusting means is inoperative. The predetermined limit of adjustment is selected in accordance with the thickness of the friction lining so that the limit is reach before the lining is worn too thin for safety.

The invention has for a further object to provide a brake having a drum, a pair of brake shoes within the drum and having adjacent ends connected by an adjustment device, means for automatically adjusting the device to adjust the shoes for wear, and means for rendering the automatic adjusting means inoperative when a predetermined limit of total adjustment is reached.

Other objects and features of the invention will become apparent as the description proceeds, especially when taken in conjunction with the accompanying drawings, illustrating preferred embodiments of the invention, wherein:

FIG. 4 is a view similar to FIG. 2 but shows a modified construction.

FIG. 5 is similar to FIG. 2 but shows another modified construction.

FIG. 6 is a fragmentary elevation partly in section of a further modified construction.

FIG. 7 is a section on the line 7—7 of FIG. 6.

FIG. 8 is similar to FIG. 6 and shows still another modification.

FIG. 9 is a section on the line 9—9 of FIG. 8.

Figure 1:
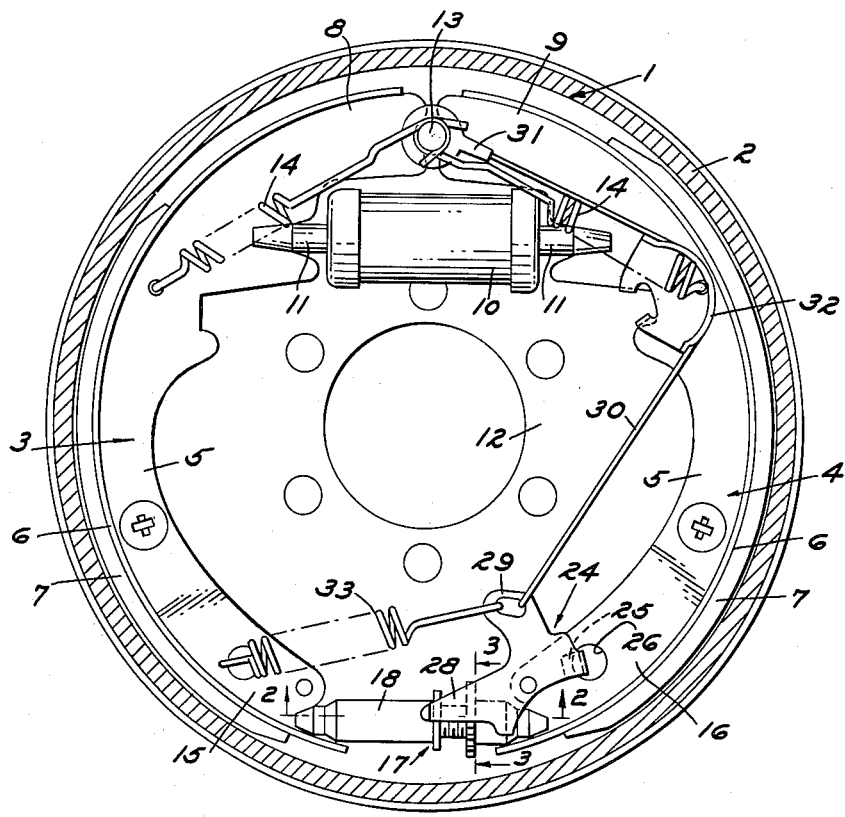
FIG. 1 is a side elevation partly in section of a brake embodying the invention.

The brake is a motor vehicle wheel brake of the type having a brake drum which is secured to and revolvable with the ground engaging wheel of a motor vehicle and also having an internal friction device within and engageable with the annular flange of the drum. The drum 1 has an annular cast-iron brake flange 2. The friction device comprises the pair of shoes 3 and 4 which are alike, each shoe being of T cross-section and having the radial web 5, the arcuate flange or rim 6 secured to the web and the brake lining 7 secured to the arcuate flange or rim and engageable with the brake flange 2.

The shoes have the separable ends 8 and 9 adapted to be spread apart to move the shoes into engagement with the brake flange by a wheel cylinder 10 having a pair of oppositely acting pistons (not shown) respectively connected to the separable ends 8 and 9 by rods 11. The wheel cylinder is mounted on the backing plate 12 adapted to be secured to the axle housing by suitable means such as bolts. One or the other of the shoe ends 8 and 9 anchor on the anchor pin 13 also mounted on the backing plate. Return springs 14 are connected to the anchor pin and to the web of each shoe to normally hold the shoes in the retracted position shown in which the brake lining 7 is out of engagement with the brake flange.

The shoes have the other adjacent ends 15 and 16, and the adjustment device 17 extends between ends 15 and 16 for adjusting them relative to each other to take care of wear of the lining 7. The adjustment device comprises the axially aligned members 18 and 19 and the rotatable member 20. The members 18 and 19 have bifurcated ends embracing and abutting recessed portions of the ends of the web 5. The rotatable member has the cylindrical pin 21 journalled in the cylindrical socket of the member 19, the shank 22 extending into and threadedly engaging the socket of the member 18 and the integral peripherally notched ratchet wheel 23 abutting member 19.

The automatic brake shoe adjuster comprises a lever or pawl 24 at one side of the web 5 of shoe 4 having a tab 25 extending through a hole 26 in the web and return bent at the other side of the web to provide a fulcrum mounting for the lever or pawl. The pawl has an extended portion or tooth 28 adapted to engage the notches of the ratchet wheel. The pawl also has an apertured portion 29, and a cable 30 is connected at one end to the apertured portion of the pawl and at the other end to a ring 31 secured to the anchor pin 13. The intermediate portion of the cable extends over and slidably engages the arcuate guide portion of a stamping 32 secured to the web of shoe 4. The spring 33 is held under tension between shoe 3 and the pawl, having one end connected to the web of the shoe and the other end connected to the apertured portion 29 of the pawl. The spring 33 holds the shoe webs in engagement with the members 18 and 19 of the adjustment device and also normally holds the pawl in the position shown with respect to its fulcrum point.

The pawl is formed of a deformable material and the end of the tooth 28 of the pawl is bent toward the adjustment device to provide a trip 34. The member 18 of the adjustment device has a collar 35 threaded thereon for axial adjustment and engageable with the trip 34. The spring 33 applies a lateral force upon the pawl, urging it against the notched periphery of the wheel 23, or to the right in FIG. 3.

When the brake is applied during reverse motion of the vehicle and clockwise rotation of the brake flange, the end 9 of shoe 4 is moved away from an anchored position to apply the lining 7 of the shoe against the brake flange. The shoe 4 also has a clockwise movement to apply shoe 3 which anchors on the anchor pin 13. This movement of shoe 4 produces a tensile force in cable 30 which is attached to the anchor pin and is free to communicate this tensile force to the pawl 24. The stamping 32 moves with shoe 4 away from the anchor and the cable slides through the stamping. The force on the pawl 24 exerted by the cable causes the pawl to turn clockwise about its fulcrum connection with shoe 4, moving the tooth upwardly. If the tooth is moved sufficiently, it will drop in the next notch of the wheel 23 as shown in dotted lines in FIG. 3, being urged into the notch by the lateral force of the spring 33.

When the brake is released, the shoe 4 returns to retracted position, releasing the tensile force on the cable 30. The spring 33 then urges the pawl to its normal position of FIG. 1, causing the wheel 23 to rotate in a direction to spread apart the ends 15 and 16 of the shoes.

Although each reverse application of the brake has the effect of turning the pawl 24, an adjustment will not be effected unless the tooth 28 is moved far enough to drop into the next notch. In other words, there is a minimum shoe movement required before an adjustment is made to take up wear.

Figure 2:
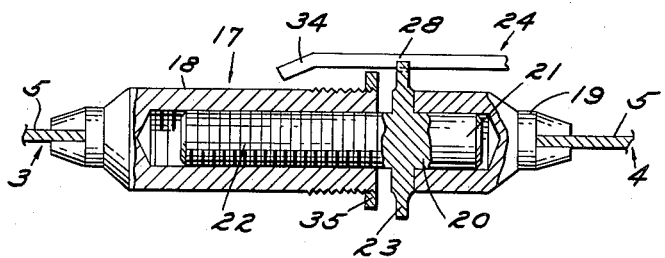
FIG. 2 is a section on the line 2—2 of FIG. 1, showing the members of the adjustment device in a different position.

The adjustment device 17 is shown in FIG. 2 before any automatic adjustment for wear has taken place. After repeated automatic adjustments, the member 18 will move to the left until the collar 35 engages the trip 34 and lifts the pawl away from the wheel 23. The condition in which further adjustment will result in engagement of the trip by collar 35 is shown in FIG. 1. No further automatic adjustment can then take place so that before the lining is worn dangerously thin, the operator will begin to be aware of an excessive brake pedal travel, indicating that the brakes should be serviced by a mechanic.

The automatic adjustment for wear does not occur upon forward braking, because the shoe 4 anchors on anchor pin 13 and does not partake of the described movement necessary to operate the pawl through the cable. Forward braking is usually much more vigorous and takes place at higher speeds than reverse braking, producing exceedingly high temperatures which result in overheating and expansion of the brake drum flange. Hence it is not desirable to adjust automatically upon forward braking, since excessive clearance may be the result of temporary drum expansion rather than lining wear.

The collar 35 may be initially adjusted axially of member 18 by rotation, to determine the limit of automatic total adjustment, or the same thing may be accomplished without adjusting the collar by manually bending the tooth so that the trip portion will be engaged by the collar after a smaller or greater total automatic adjustment has taken place.

FIG. 4 illustrates a modification in which the adjustment device 36 comprises the axially aligned members 37 and 38 and the rotatable member 39. The members 37 and 38 have bifurcated ends embracing and abutting recessed portions of the ends of the webs 5. The rotatable member has the cylindrical pin 40 journalled in the cylindrical socket of the member 37, the socket portion 41 threadedly receiving the member 38 and the integral peripherally notched ratchet wheel 42. The end of the socket portion 41 abuts the member 37. The lever or pawl 24 is exactly like the one previously described except that the end of the tooth 28 is not bent to provide a trip, and is fulcrumed on the web of the shoe 4 in the same manner.

Automatic adjustment of the adjustment device 36 to spread apart the adjacent ends of the shoes is effected in the same manner as in FIG. 1, that is by the rocking motion of the pawl to pick up successive teeth on the ratchet wheel and relatively rotate members 38 and 39 of the adjustment device. The automatic adjustment will continue to take up clearance caused by wear of the brake lining until the member 39 moves to the left far enough to remove the ratchet wheel 42 from engagement with the tooth 28, that is until the ratchet wheel reaches the dotted line position shown in FIG. 4. Thereafter, the operation of the pawl will effect no further adjustment.

FIG. 5 shows another modification in which the adjustment device 43 comprises the axially aligned members 44 and 45 and the rotatable member 46. The members 44 and 45 have bifurcated ends embracing and abutting recessed portions of the ends of the webs 5. The rotatable member 46 has at one end a cylindrical socket 47 in which is journalled a cylindrical pin 48 of member 45. Member 46 has at the other end a threaded bore 49 of smaller diameter than the socket which opens into the socket to define an annular shoulder 50 engageable with the head 51 of the member 44 threadedly received in the bore. Member 46 abuts member 45 and has an integral ratchet wheel 52. The automatic adjusting lever or pawl 24 is exactly like the one shown in FIG. 1 except that the end of the tooth 28 is not deformed to provide a trip, and is fulcrumed on the web of the shoe 4 in the same manner. Automatic adjustment of the device 43 is effected in the same manner as in FIG. 1, that is by the rocking motion of the pawl to pick up successive teeth on the ratchet wheel.

The tooth is engageable with the notches of the ratchet wheel 52 to relatively rotate the members 44 and 46 of the adjustment device and spread apart the adjacent shoe ends. The automatic adjustment may continue until the head 51 engages the shoulder 50 after which time relative rotation of the members 44 and 46 is prevented and no further automatic adjustment can take place. As the lining continues to wear, the cable will pull the pawl far enough to pick up another tooth on the ratchet wheel. However, the rotatable member 46 cannot be further rotated by the operation of spring 33 and hence the cable will thereafter be slack.

FIGS. 6 and 7 show a further modification. The adjustment device 53 there shown is exactly like the adjustment device 17 except that the collar 35 is omitted. The lever or pawl 24 is exactly like the one shown in FIG. 1 except that the tooth 28 does not have a trip, and is fulcrumed on the web of shoe 4 in the same manner. A link 54 has a mounting portion 55 which overlies the web of shoe 3. The mounting portion is formed with the cylindrical projections 56 which extend into holes 57 and 58 in the web to locate the link. The spring 33 has one end 59 extending through the hole 58 and bears upon the mounting portion to hold it in place. The link has an extended portion 60 which terminates in a flange 61 that extends over the edge 62 of the tooth 28 of the pawl. There is a substantial clearance between the edge 62 and the flange 61 so that the shoes can be automatically adjusted in the way previously described. After a predetermined limit of total adjustment, the flange will move into engagement with the edge 62 and actually rotate the pawl slightly in a clockwise direction so that it will thereafter be inoperative to effect an automatic adjustment for wear.

FIGS. 8 and 9 show still another modification in which the adjustment device 63 is exactly like the one shown in FIG. 1 except that the collar 35 is omitted. The pawl 24 is exactly like the one shown in FIG. 1 except that it does not have a trip on the end of the tooth 28, and is fulcrumed on the web of the shoe 4 in the same manner. The spring 33 has its end 59 extending through the opening 58 in the web of shoe 3 to connect it thereto, and a link 64 has a return bent portion 65 which extends within the coil of the spring 33. The other end of the link has a flange 66 which extends through a hole 67 in the pawl and is formed with a retaining lip 68. The automatic adjustment is effected in the way previously described and will continue until the clearance between the bite 69 of the link and the spring is taken up whereupon the link will rock the pawl slightly in a clockwise direction and prevent further automatic adjustment.

Figure 3:
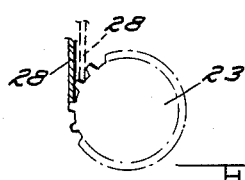
FIG. 3 is a section on the line 3—3 of FIG. 1.

Except for the differences noted, the constructions of FIGS. 4-9 are like FIGS. 1-3.

What I claim as my invention is:

1. A brake comprising a brake drum, a pair of brake shoes within and engageable with said drum and having adjacent ends, a device extending between said adjacent ends of said shoes and including first and second members threaded together, means providing a non-rotatable connection between said first member and said end of one of said shoes and means providing a rotatable connection between said second member and said end of the other of said shoes, said second member having a ratchet wheel thereon, automatic adjustment means including an element operatively connected to said one of said shoes for movement circumferentially therewith and engageable with said wheel to rotate the latter for relatively axially moving said first and second members to adjust said shoes and compensate for wear, said element extending toward the other of said shoes axially with respect to said device a predetermined distance beyond said wheel to establish the limit of adjustment before said wheel moves beyond the end of said element and out of engagement therewith preventing further adjustment.

2. The brake defined in claim 1 wherein said element is a pawl fulcrumed on the said one of said shoes.

References Cited in the file of this patent

UNITED STATES PATENTS

| | | | |
|---|---|---|---|
| 1,852,325 | Lyman | Apr. 5, | 1932 |
| 2,167,706 | Berno | Aug. 1, | 1939 |
| 2,301,272 | Goepfrich | Nov. 10, | 1942 |
| 2,340,464 | Gates | Feb. 1, | 1944 |
| 2,522,181 | Krikorian | Sept. 12, | 1950 |
| 2,938,610 | Dombeck et al. | May 31, | 1960 |

FOREIGN PATENTS

| | | | |
|---|---|---|---|
| 1,132,072 | France | Oct. 29, | 1956 |
| 779,889 | Great Britain | July 24, | 1957 |